United States Patent
Shafer

(10) Patent No.: US 10,544,806 B2
(45) Date of Patent: Jan. 28, 2020

(54) ADJUSTABLE HEIGHT DISCONNECT

(71) Applicant: CONERY MANUFACTURING, INC., Ashland, OH (US)

(72) Inventor: Chris Shafer, Ashland, OH (US)

(73) Assignee: CONERY MANUFACTURING, INC., Ashland, OH (US)

( * ) Notice: Subject to any disclaimer, the term of this patent is extended or adjusted under 35 U.S.C. 154(b) by 212 days.

(21) Appl. No.: 15/700,750

(22) Filed: Sep. 11, 2017

(65) Prior Publication Data

US 2018/0119405 A1    May 3, 2018

Related U.S. Application Data

(60) Provisional application No. 62/385,579, filed on Sep. 9, 2016.

(51) Int. Cl.
*F04D 29/60* (2006.01)
*E03F 5/22* (2006.01)
*F16L 37/26* (2006.01)

(52) U.S. Cl.
CPC ............ *F04D 29/607* (2013.01); *E03F 5/22* (2013.01); *F04D 29/606* (2013.01); *F16L 37/26* (2013.01); *F04D 29/60* (2013.01)

(58) Field of Classification Search
CPC ...... F04D 29/60; F04D 29/606; F04D 29/607; F16L 37/26; E03F 5/22
USPC ................................................. 417/360, 361
See application file for complete search history.

(56) References Cited

U.S. PATENT DOCUMENTS

| | | | | | |
|---|---|---|---|---|---|
| 3,645,333 | A | * | 2/1972 | Maass | E21B 33/00 166/85.2 |
| 3,771,915 | A | * | 11/1973 | Back | F04D 29/607 417/360 |
| 3,976,131 | A | * | 8/1976 | Woodford | E21B 33/00 166/85.2 |
| 4,060,345 | A | * | 11/1977 | Blum | F04D 29/607 417/360 |
| 4,564,041 | A | * | 1/1986 | Kramer | F16L 37/26 137/315.01 |
| 4,886,426 | A | * | 12/1989 | Surinak | E03F 5/22 417/360 |
| 5,507,628 | A | * | 4/1996 | Masse | F04D 29/607 248/669 |
| 6,059,208 | A | * | 5/2000 | Struthers | E03F 5/26 241/285.1 |

* cited by examiner

*Primary Examiner* — Peter J Bertheaud
(74) *Attorney, Agent, or Firm* — Tucker Ellis LLP; Michael G. Craig

(57) ABSTRACT

One or more techniques and/or systems are disclosed for mitigating a need to construct a series of elbows, pipes, couplings and valves, typically needed to install a pump into a basin or pit. The methods and systems described herein may allow an installer of such a system to install the unit at a variety of heights; and may allow the installer to use a variety and multiple materials for guiding the pump into the basin or pit. The system may comprise a guide secured in the pit, and a cradle assembly secured to the guide at a desired height. A pump coupler can be secured to a pump, and slid into the cradle to fluidly couple the pump with a discharge pipe attached to the cradle assembly.

19 Claims, 14 Drawing Sheets

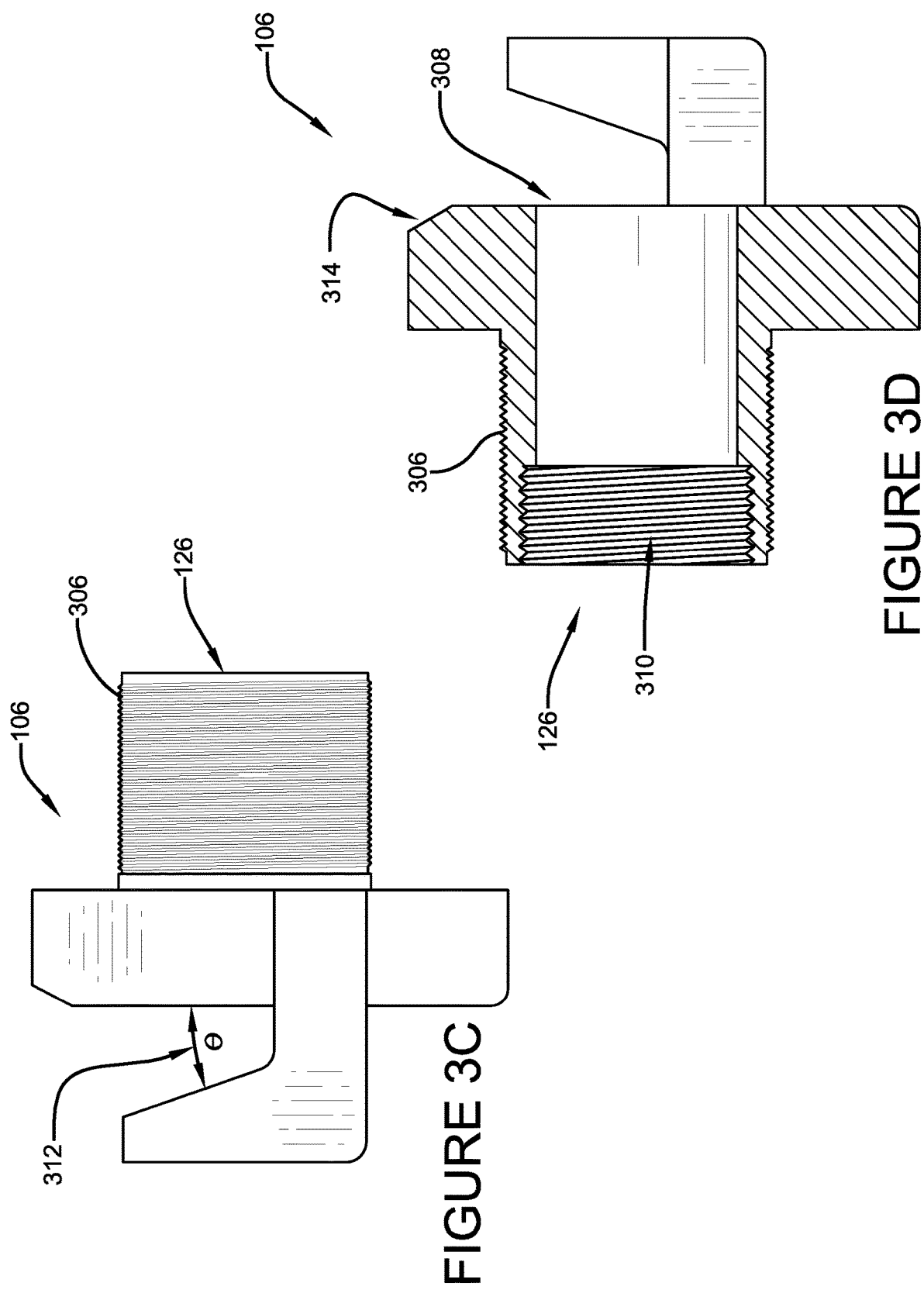

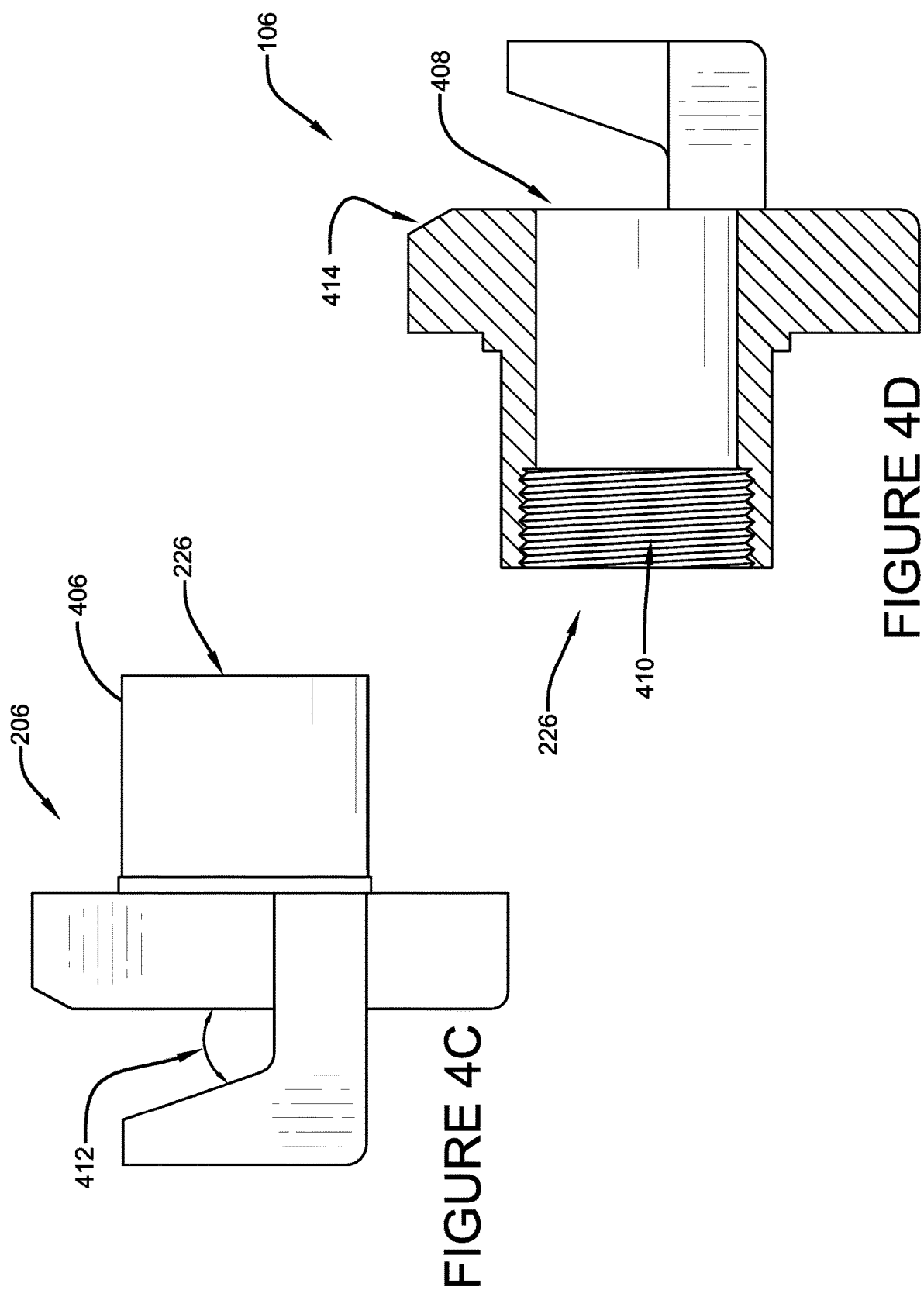

ADJUSTABLE HEIGHT DISCONNECT

CROSS-REFERENCE TO RELATED APPLICATIONS

This application claims priority to U.S. Provisional Patent Application Ser. No. 62/385,579, entitled ADJUSTABLE HEIGHT DISCONNECT WITH CHECK VALVE, filed Sep. 9, 2016, which is incorporated herein.

BACKGROUND

Several devices are currently on the market that are similar and allow you to remove the pump in this manner. The differences in this design are that some designs are mounted in the basin at set heights and are not variable, they are set up to use only one type of guide, or you have to use "off the shelf" pipes, valves and couplings to construct your own removable coupling, which is costly and is not as compact as this design. This allows the installation to be very customizable for the installer.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

As provided herein, systems and method that can help mitigate a need to construct a series of elbows, pipes, couplings and valves, typically needed to do the same thing, while installing a pump into a basin or pit. Further, the methods and systems described herein may allow an installer of such a system to install the unit at a variety of heights; and may allow the installer to use a variety and multiple materials for guiding the pump into the basin or pit.

In one implementation, system for installation of a pump into a basin or pit can comprise a guide component configured to be selectably, fixedly installed in the basin, such as using an upper bracket and a lower bracket. Further, the guide component can comprise at least two railings that are disposed between a lower portion of the basin and an upper portion of the basin; and a guide wall disposed between the at least two railings. In this implementation, the guide wall can be so dimensioned to receive a cradle coupling port disposed through the guide wall at a location selected for appropriate installation of a fluid pump in the target basin.

Additionally, an example system can comprise a cradle component that is selectably, fixedly installed on the guide component. The cradle component can comprise a rear coupler configured to operably, fixedly engage the guide component through the guide wall at the cradle coupling port to operably, fluidly couple with a fluid discharge pipe. The cradle component can also comprise a cradle arm component configured to selectably, operably receive a pump coupler and hold the pump coupler in operable, fluid coupling with the rear coupling.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

BRIEF DESCRIPTION OF THE DRAWINGS

What is disclosed herein may take physical form in certain parts and arrangement of parts, and will be described in detail in this specification and illustrated in the accompanying drawings which form a part hereof and wherein:

FIGS. 3A-3F are a component diagrams illustrating example implementations of one or more portions of one or more components described herein.

FIGS. 4A-4F are a component diagrams illustrating example implementations of one or more portions of one or more components described herein.

DETAILED DESCRIPTION

Figure 1:
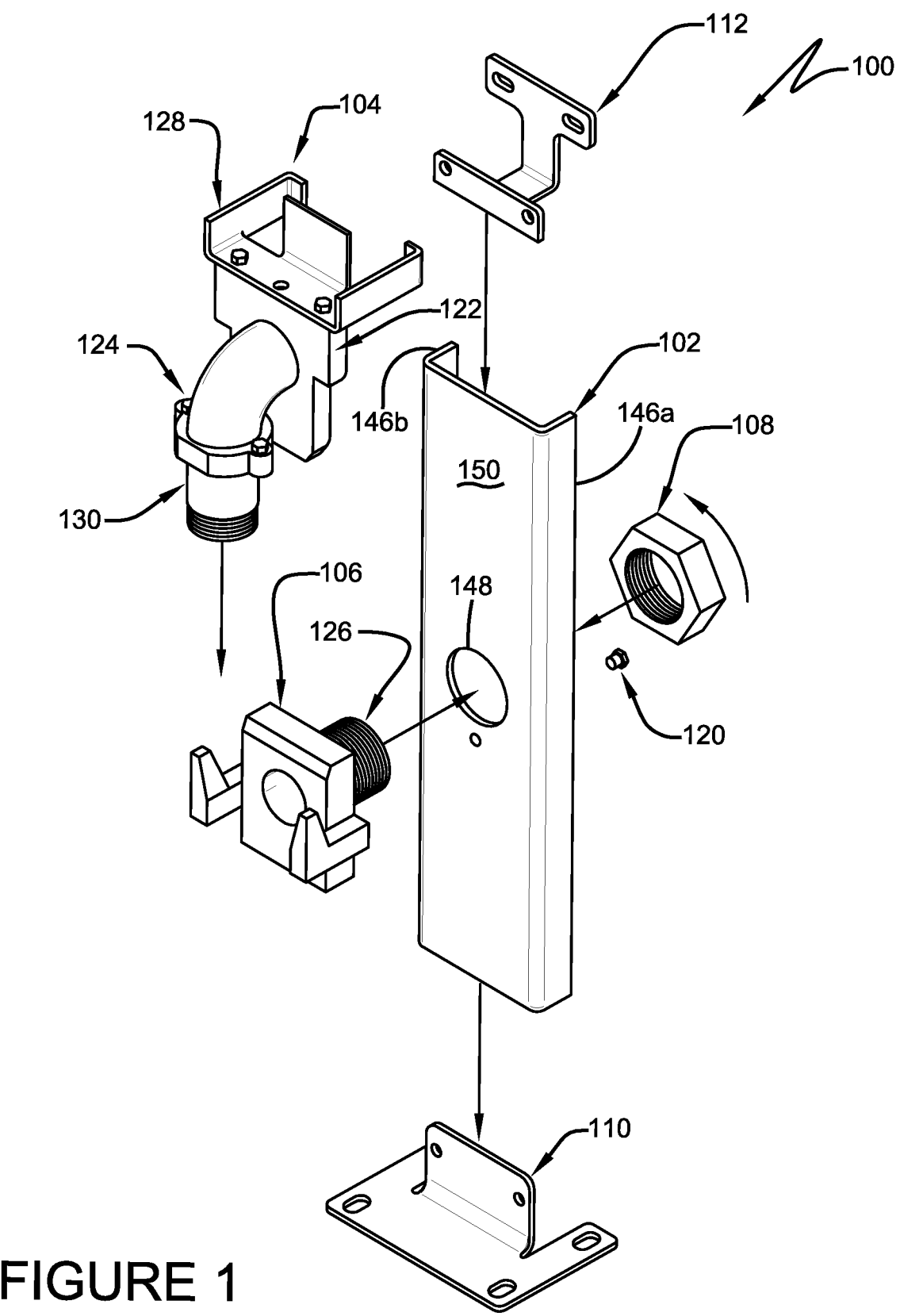
FIG. 1 is a component diagram illustrating an example implementation of an exemplary system used for installation of a pump into a basin or pit.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices may be shown in block diagram form in order to facilitate describing the claimed subject matter.

A pump placement system can be devised that allows a discharge pump of a fluid discharge system to be selectably, removably placed in a sump pit or basin, where the location and/or height of the pump system can be adjusted to accommodate a particular situation. That is, for example, a guide system can be used to engage with a cradle assembly, configured to selectably hold a pump assembly. In this example, the location of the cradle assembly can be adjustable on the guide system to accommodate the pump and plumbing used for the discharge system in the particular target use. Previously, the cradle assembly was provided with a preset bottom bracket or support component. This arrangement, therefore, preset the height of the engaged pump assembly, which did not allow for adjustment to desirably accommodate myriad installation situations and environments.

As illustrated in FIG. 1, example system 100 comprises one implementation of a system for use in installation of a pump in a basin, sump or pit. In this example system 100, a first piece can comprise a selectably placable cradle component 106, or pump cradle, which may allow a coupled pump to be installed at a desired height in a structure, further allowing for easy installation in the field. In this implementation, a second piece can comprise a removable pump coupling 104. In one implementation, the removable coupling 104 can comprise a coupling flange 122, or pull-out flange, that selectably seats into the cradle component 106; an optional check valve (not shown), such as a check ball; and a pump adapter flange 124 that allows an end user to use the device with a variety of sizes of discharge pumps (e.g., 1.25", 1.5", or 2" or others).

The cradle component 106 can be selectably mounted onto a guide component 102 at a height or location devised by the installer to appropriately couple the pump and plumbing in accordance with the target basin or pit. In one implementation, the guide component can comprise at least two rails 146a, 146b, and a wall 150 disposed therebetween. That is, for example, the guide component 102 can comprise some form of a panel, wall, channel, pipe, tube, beam or rail, known as a guide component 102, and can comprise any suitable material, such as stainless steel, fiberglass, polymers, etc. As an example, the guide 102 can be mounted inside a fluid collecting or containing basin or pit. In one example, an installer can select a desired height for installation of the cradle component 106 based on a site situation and expected use, such as the dimensions of the pit, and/or types and amounts of fluids to be moved.

As illustrated in FIG. 1, a lower bracket 110 may be used to facilitate securing the guide component 102 in a target basin or pit. In one implementation, the lower bracket 110 can be used to secure the guide 102 to the bottom of the structure (e.g., or side wall at a bottom portion), using fasteners; and may allow the guide 102 to be selectably removed and replaced. In one implementation, the lower bracket 110 may be formed with the guide 102, such by fabricating a bracket structure at the lower portion of the guide 102. Further, an upper guide bracket 112 may also be used to facilitate securing the guide 102 in a target basin or pit. In one implementation, the upper guide bracket 112 may allow the guide 102 to be secured at or near the top of the structure, using fasteners; and may also allow for selectable installation and/or replacement of the guide 102. In one implementation, the upper bracket 112 may be formed with the guide 102, such by fabricating a bracket structure at the upper portion of the guide 102. Further, in one implementation, both the upper and lower brackets 110, 112 can be formed with the guide 102.

In one implementation, the cradle component 106 (e.g., stationary cradle) can be mounted and secured in place by a nut 108 and an optional bolt 120 (e.g., or some other suitable fastening component(s)), which may not be needed in some applications. The bolt 120 can be used to secure the cradle component 106 in a fixed position to keep the cradle component 106 from potential rotational movement. In this implementation, after the cradle 106 is mounted, a pipe can be coupled directly onto the rear coupling 126 of the cradle, for example, and run to a discharge line, or discharge pipe. As an example, after the cradle 106 and piping are installed, an installer may connect a pump adapter 130 to a discharge hole of a target discharge pump, for example, by threading the two together (e.g., or by some other coupling means, such as gluing, soldering, welding, etc.). After the pump adapter 130 is installed onto the pump, for example, the installer can couple (e.g., bolt) the pump adapter 130 to the removable coupling 124. In one implementation, an integral check valve may be utilized in the system 100, for example, by adding a check valve ball inside (e.g., or near) the coupling 124.

As an example, after the removable coupling 104 is fully assembled to a pump the installer can attach one of several different styles of rail engagement components 128 (e.g., guide plates) to the removable coupling 104. In one implementation, a rail engagement component 128 can be coupled with the removable coupling 104, such as a lower guide bracket, that can be used to guide the removable portion into an appropriate seated position in the cradle component 106. As an example, the type and style of rail engagement component 128 can be determined by the type of guide 102 used in the basin or pit. As an illustrative example, the guide plate 128 can allow the coupling component 106 and pump to be lowered inside a basin or pit, and allow the pump coupling component 106 to appropriately mate up with the cradle 106 to form a fluid seal. In one implementation, the fluid seal between the opening in the removable coupling 104 and the opening in the cradle component 106 can be achieved by either a metal-to-metal fit, or may be achieved using a gasket (e.g., an O-ring) disposed between the two parts.

As an illustrative example, after the unit is installed and sealed, the attached pump may be able to transfer liquid out of the basin or pit through the installed piping on the back side 126 of the cradle 106. Further, if the pump or basin or pit should need to be serviced, the pump can be removed without disconnection of the main piping from the cradle component 106, thereby allowing the pump to slide up the guide 102 and be removed from the basin or pit.

In one implementation, the pump adapter 130 can comprise a variety of sizes that are configured to be used with various pumps. For example, the pump adapter 130 may be configured to fluidly couple with 1.25", 1.50" or 2.0" discharge pumps. In this example, an appropriate pump adapter may be coupled with the coupling 124, such as at installation, in order to fluidly couple with the corresponding discharge pump size. As an illustrative example, this feature may be useful when a pump discharge system is plumbed using a first pipe diameter (e.g., 2" discharge pipe), and a variety of differently sized pumps can be interchanged in the system using the variety of appropriately sized pump adapters 130, without needing to re-pipe the rest of the system.

FIGS. 3A-3F are component diagrams illustrating example implementations of the cradle component 106 of the system 100, as described herein. In this example implementation, the cradle portion 106 comprises a cradle flange 302, with one or more cradle arms 304 extending from either side of the cradle flange 302. The cradle arms 304, in conjunction with the cradle flange 302, can be configured to selectably couple with the pump coupler 104 (e.g., removable portion) of the system 100, such that an opening in pump coupler 104 aligns appropriately (e.g., fluidly) with an opening 308 in the cradle component 106, at the cradle flange 302. Further, the rear coupler 126 can comprise a pipe coupler 306 that is disposed at the rear side of the flange 302. The pipe coupler 306 can comprise and external thread that is configured to operably couple with (e.g., threadedly engage with) a pipe (e.g., with complementary internal thread), for example, to effectively transport fluids between the opening 308 in the cradle flange 202 and a target pipe coupled with the cradle portion 106. In one implementation, the pipe coupler 306 may comprise internal thread 310 for coupling with an alternate pipe (e.g., with a street coupler).

Figure 5A:
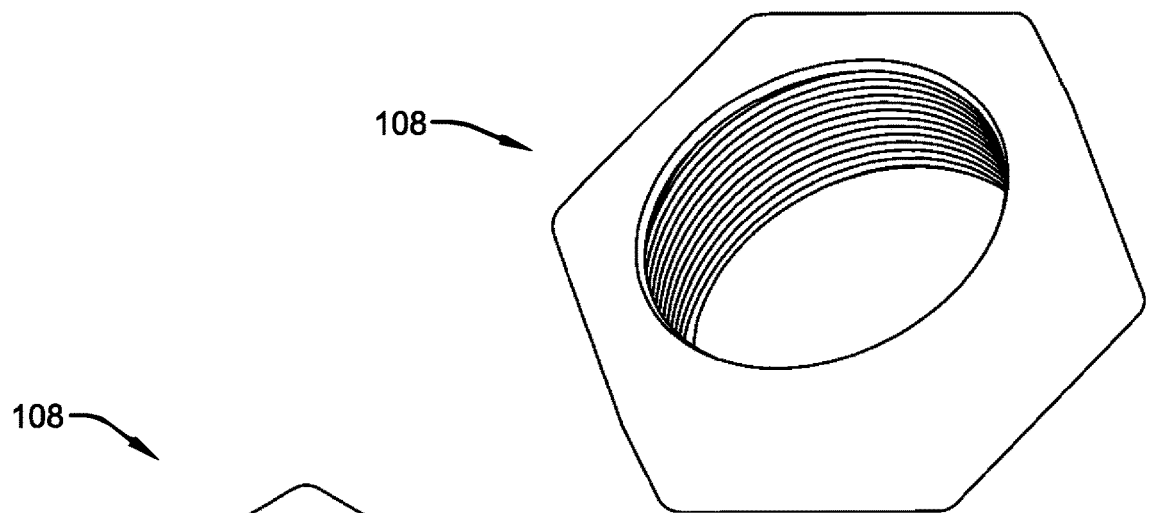
FIG. 5A-5C are a component diagram illustrating an example implementation of one or more portions of one or more components described herein.
Figure 5B:
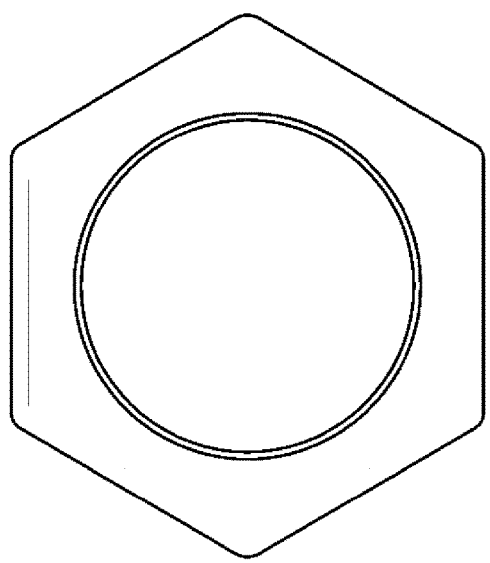
Figure 5C:
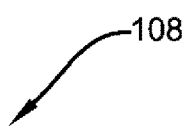

FIGS. 5A-5C are component diagrams illustrating example implementations of a fastening component 108

(e.g., a cradle nut). In one implementation, the fastening component 108 can be used to selectably engage with the rear coupler 206 of the cradle portion 106, for example, to secure the cradle component 106 to the guide 102. As an example, the rear pipe coupler 306 may be installed through the port 148 in the guide wall 150, and the fastening component 108 can be threadedly engaged with the pipe coupler 306, at least until it meets the rear face of the guide wall 150. In this way, in this example, the cradle portion 106 can be selectably secured to the guide 102, and may allow for easy installation and/or replacement.

Figure 2A:
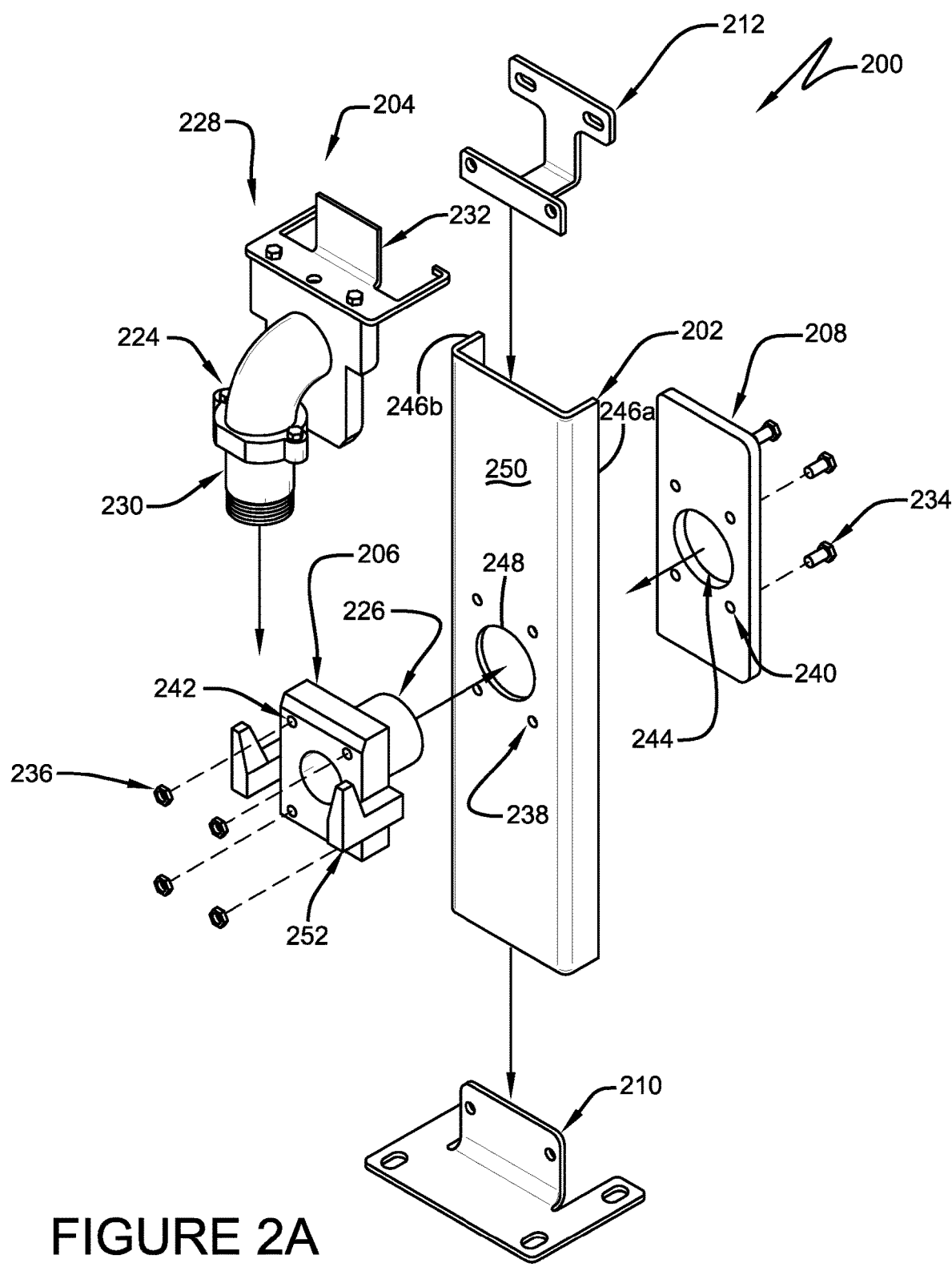
FIG. 2A-2C are a component diagram illustrating an alternate example implementation of an exemplary system used for installation of a pump into a basin or pit.
Figure 2B:
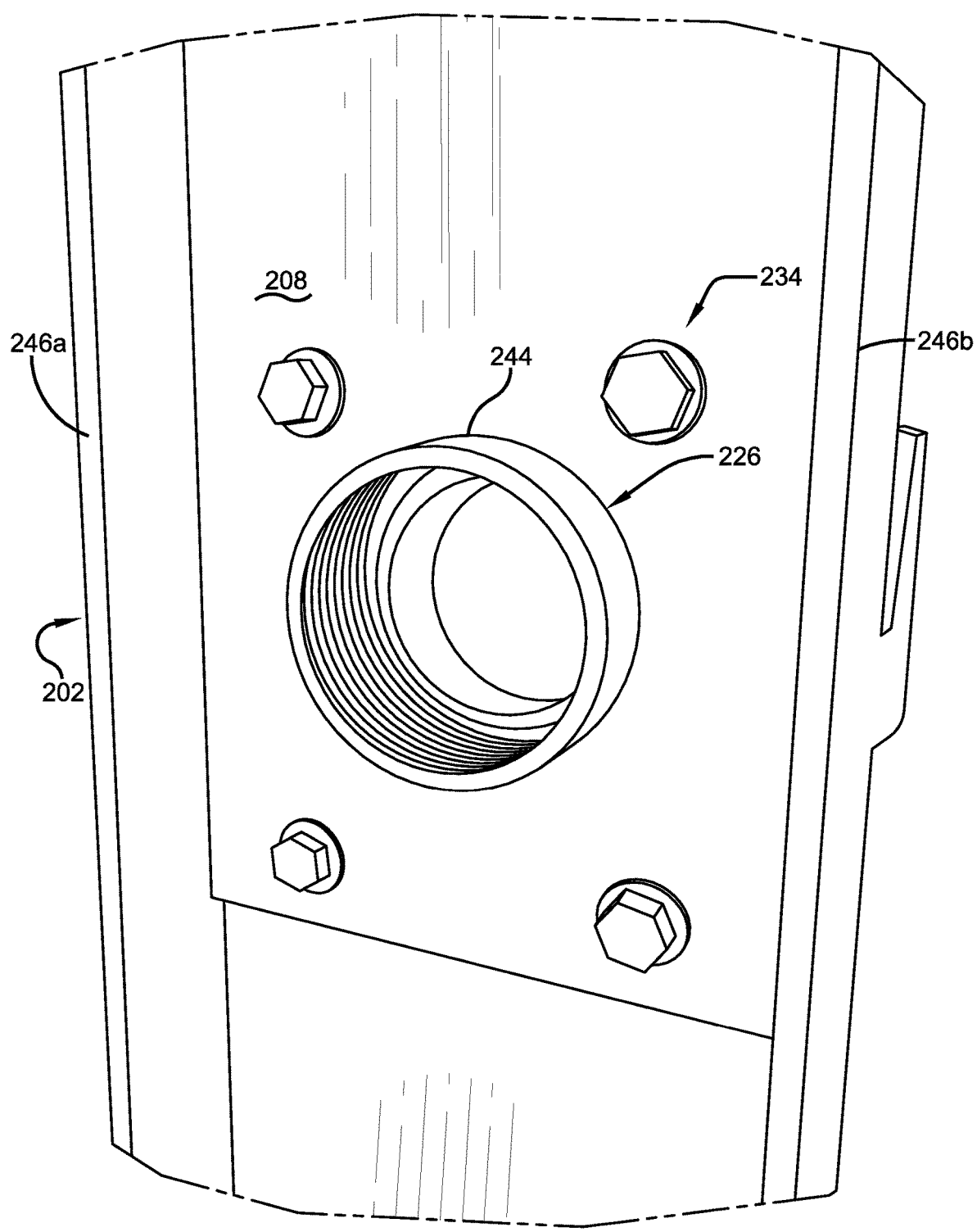
Figure 2C:
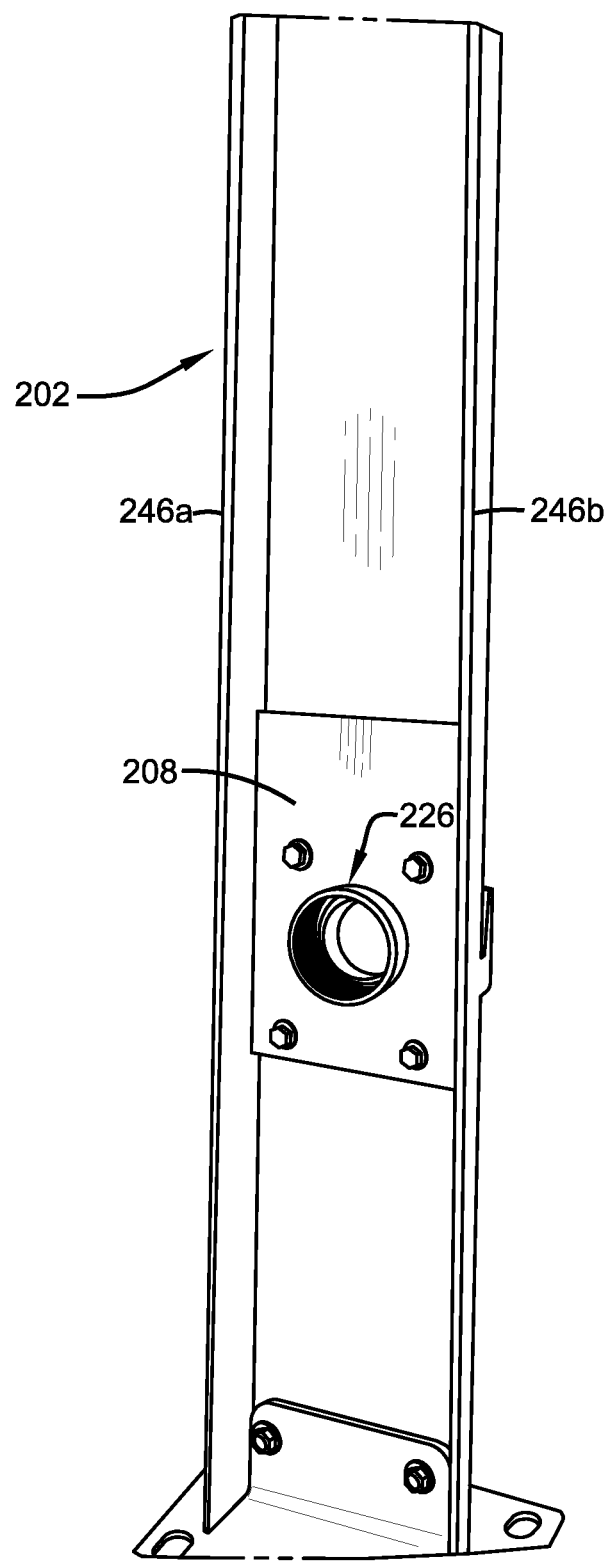

FIGS. 2A-2C are component diagrams illustrating example implementations of an alternate implementation of a system 200 for installation of a fluid pump into a basin or pit, or a system for removing fluids from a basin. In this example implementation, the system 200 can comprise a guide component 202 configured to be fixedly installed in a target fluid collection basin. The guide component can comprise at least two railings 246a, 246b that are operably disposed between a lower portion of the basin and an upper portion of the basin. Further, the guide component 202 can comprise a guide wall 250, that is disposed between the at least two railings 246a, 246b. The guide wall can be configured, and so dimensioned, to receive a cradle coupling port 248, that may be disposed through the guide wall 250 at a location selected for appropriate installation of a fluid pump in the target basin. That is, for example, the cradle coupling port 248 can be placed in the guide wall at a location determined by the installer at or prior to installation, based on the installation situation.

Additionally, in system 200 a cradle component 206 can be configured to be fixedly installed on the guide component 202. The cradle component 206 can comprise a rear coupler 226 (e.g., rear coupling pipe) that is configured to operably, fixedly engage the guide component 202 through the guide wall 250 at the cradle coupling port 248, to operably, fluidly couple with a fluid discharge pipe. The cradle component 206 can also comprise a cradle arm component 252 to selectably, operably receive a pump coupler 204, and hold the pump coupler 204 in operable, fluid coupling with the rear coupler 226. That is, for example, the cradle component 106 can be fastened to the guide component 202, with the rear coupler 226 passing through the cradle coupling port 248 at the desired height for proper installation of the pump.

Further, in one implementation, the selectably removable pump coupler 204 can be configured to fluidly couple a discharge portion of a pump with the fluid discharge pipe. In this implementation, the pump coupler 204 can selectably, slidably couple with the cradle component 206 using the cradle arm component 252 of the cradle component 206. Additionally, the pump coupler 204 can slidably couple with the respective at least two railings 246a, 246b. For example, the example system 200 can comprise a rail engagement component 228 that is operably, fixedly disposed on (e.g., fastened to) the pump coupler 204. In this example, the rail engagement component 228 can be configured to operably, slidably engage with the at least two railings 246a, 246b to operably, selectably slide the pump coupler 204 into and out of engagement with the cradle component 206.

In one implementation of the example system 200, the guide component 202 can comprise an upper bracket 212 that is configured to fixedly engage the guide component 202 with the basin at an upper portion of the basin. Further, the guide component 202 can comprise a lower bracket 210 that is configured to fixedly engage the guide component 202 with the basin at a lower portion of the basin.

In one implementation of the example, system 200, the guide component 202 can comprise the cradle coupling port 248, which may be disposed through the guide wall 250 at the location selected for appropriate installation of the fluid pump in the target basin. In this implementation, the cradle coupling port 248 can be formed by removing a portion of the guide wall selected for appropriate installation of the pump for the target basin. As an illustrative example, an installer of a fluid management system, which may incorporate the example, system 200, may perform s site analysis to identify objective data used to install the system appropriately, for the manner intended. In this example, the analysis (e.g., and/or preliminary site installation, such as dry fitting) may identify a preferred or desired height at which the pump (e.g., and check valve), associated piping, and the cradle component 206 should be installed for the situation. The identified location of the cradle component 206 can be used to identify the location of the cradle coupling port 248, for example, and the cradle coupling port 248 can be formed in the guide wall 250, such as by cutting, drilling, or otherwise removing that portion of the guide wall 250. In this way, as an example, the height of the installation components can be adjustable with respect to the guide component, employing a same guide component that allows for adjustment for the given situation.

In one implementation of the example system 200, as illustrated in FIGS. 2A-2C, the guide component 202 can comprise a guide wall bracket 208 that is operably disposed in a fixed engagement with the cradle component 206 at a rear face of the guide wall 250. In this implementation, the guide wall bracket 208 can comprise a bracket port 244 to allow the rear coupler 226 (e.g., rear coupling pipe) to pass therethrough. Further, in some implementations, the example system 200 (e.g., or 100) can comprise a fastener component 234, 236 (e.g., 108 in FIG. 1) to operably, fixedly engage the cradle component 206 with the guide component 202. As one example, as illustrated in FIG. 2A, the fastener component 234, 236 can comprise one or more fasteners, such as a bolt 234 and complementary nut 236 combination (e.g., or rivets, screws, clevis pins, locking pins, etc.) that are disposed through fastener opening 242, 238, 240 in the cradle component 206, guide wall 250, and guide wall bracket 208 respectively. Alternately, as illustrated in FIG. 1, for example, a cradle nut 108 may be used to engage a threading disposed on the rear pipe coupler 126.

In one implementation of the example system 200, as illustrated in FIGS. 2A-2C, as further illustrated in FIGS. 4A-4F, the cradle arm component 252 can comprise one or more arms 404 extending from a front face of a cradle flange 402 of the cradle component 206. For example, the one or more arms 404 can extend substantially perpendicularly from the cradle flange 402. Further, in one implementation, the respective arms 404 can comprise a hook or elbow shape that provides a protrusion extending upward from the arm 404 (e.g., when operably installed). In this implementation, for example, the hook shape of the one or more arms 404 may be used to effectively receive and hold the pump coupler component 204 in engagement with the cradle component 206.

Figure 3A:
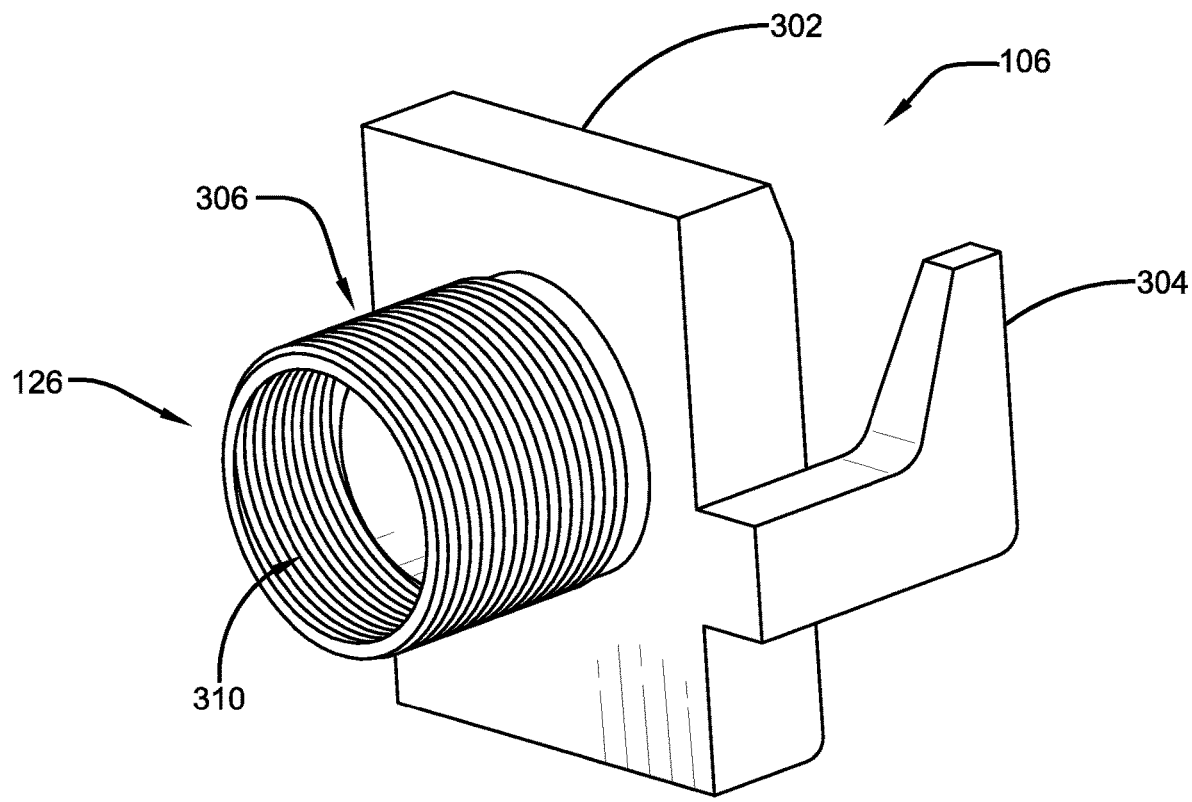
Figure 3B:
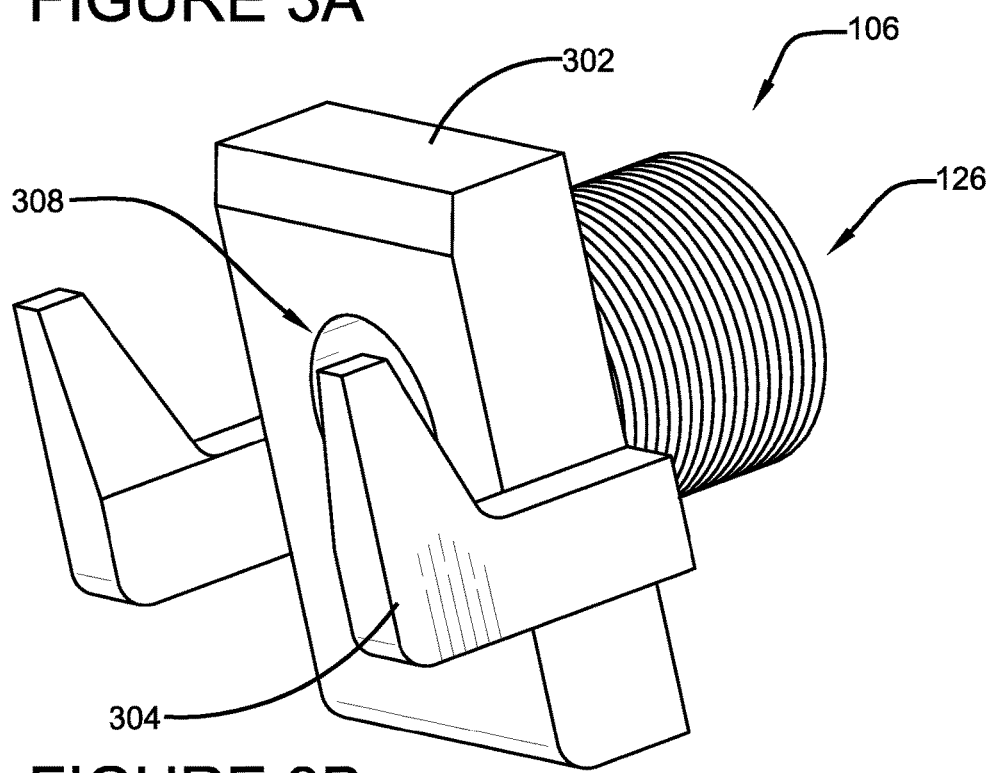
Figure 3F:
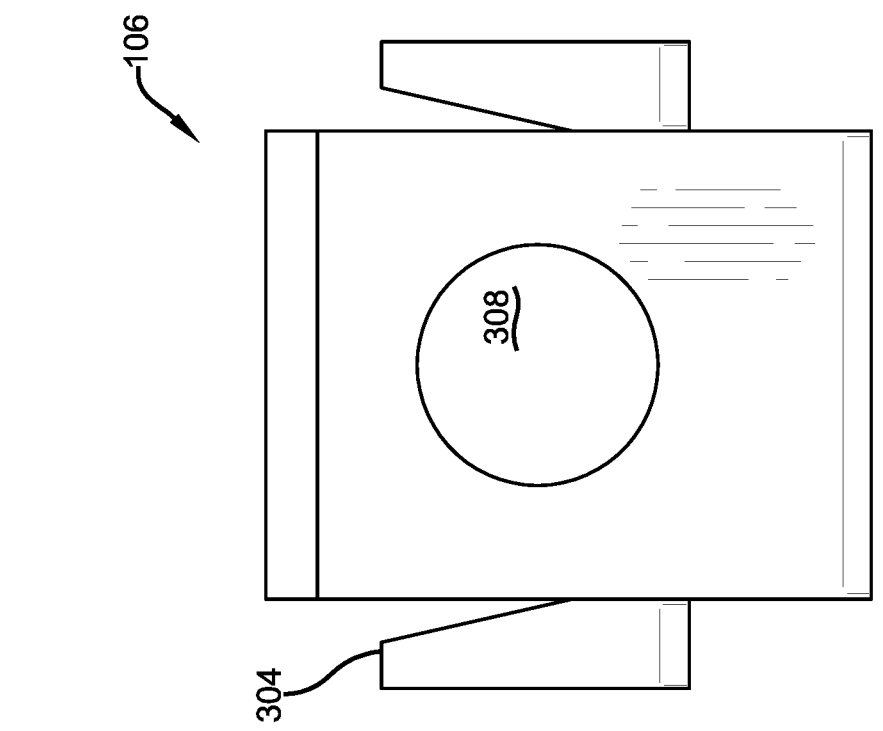
Figure 3E:
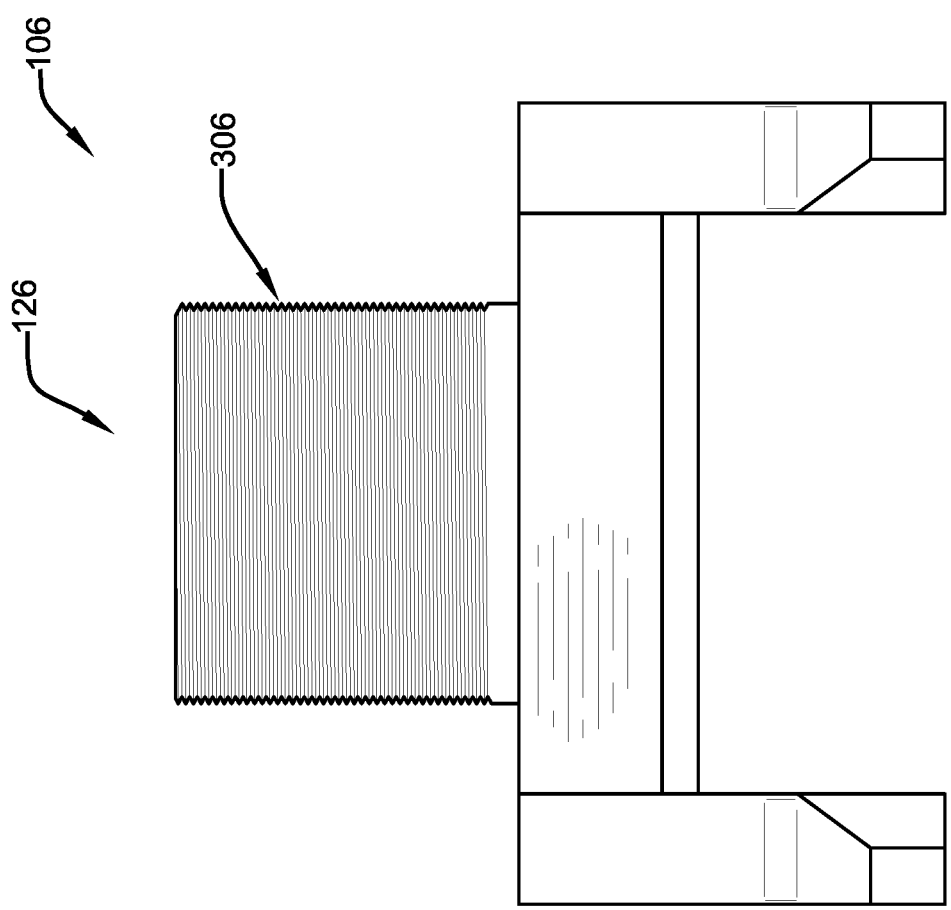
Figure 4A:
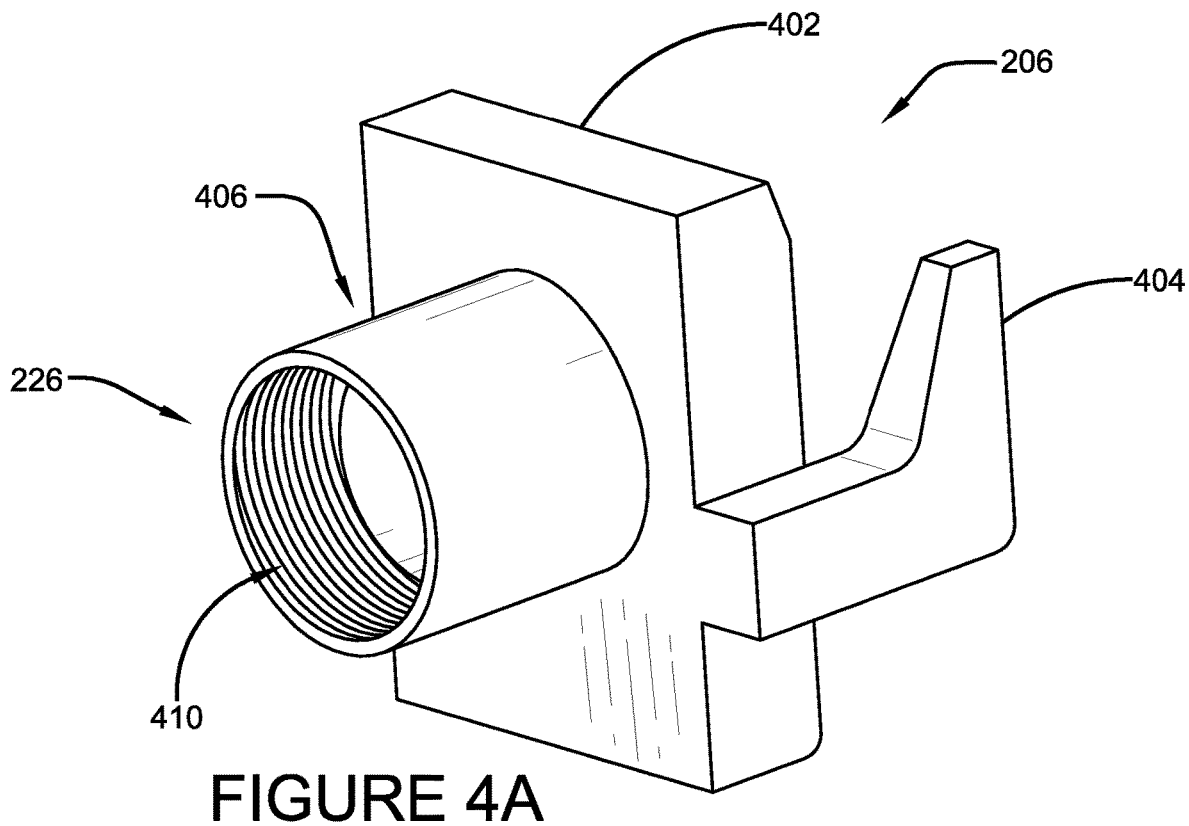
Figure 4B:
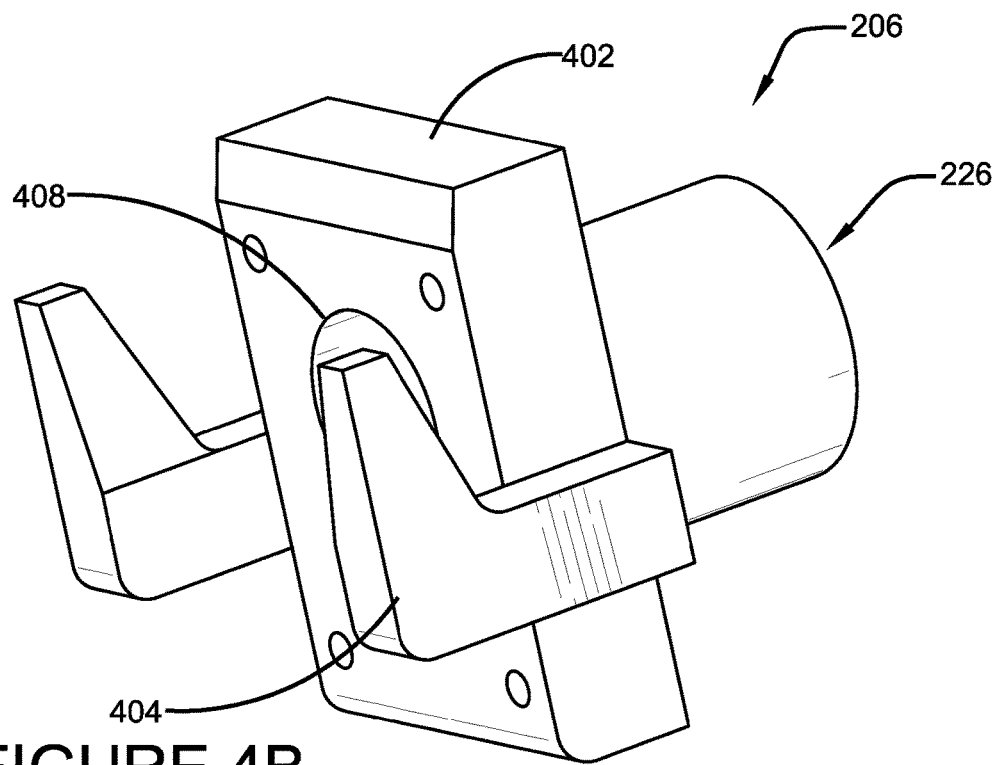
Figure 4F:
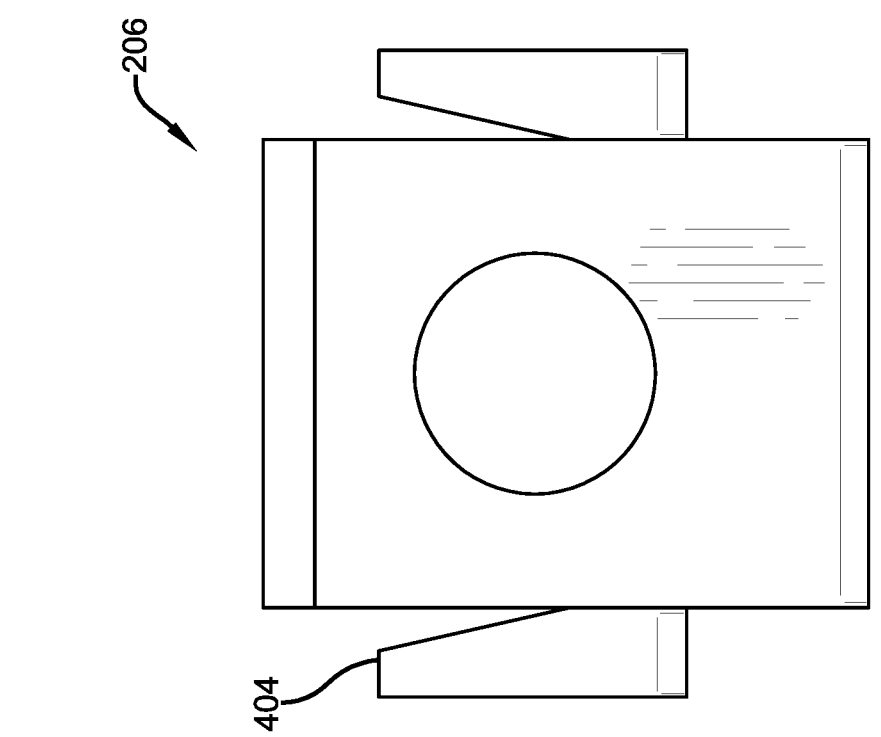
Figure 4E:
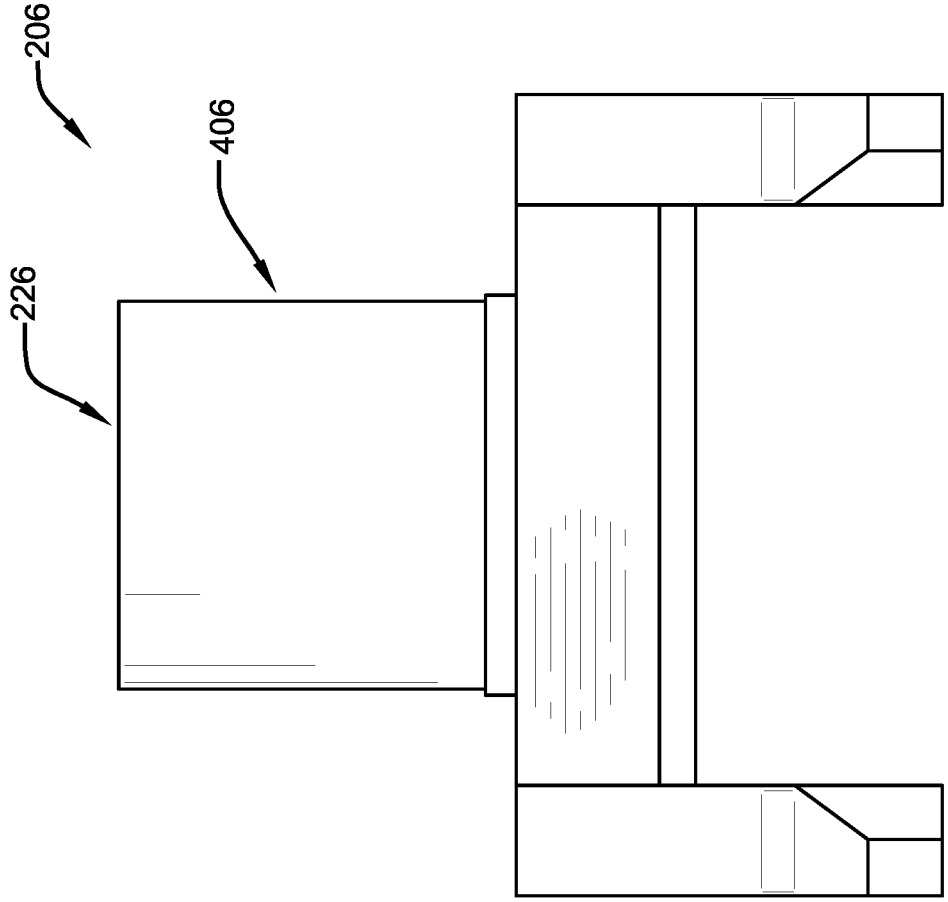

In one implementation, as illustrated in FIGS. 4A-4F (e.g., and FIGS. 3A-3F), the cradle component 206 (e.g., 106) can comprise a gap 412, as shown in FIG. 3C (e.g., 312, as shown in FIG. 3C) between a rear face of the hook shape and the front face of the cradle flange 402. In this implementation, the gap can be configured to narrow from the top to the bottom to facilitate creation of a fluid seal between the pump coupler and the cradle component. That is, for example, the hook shape of the respective cradle arms 404 (e.g., 304) can be shaped to provide a sider gap at the top of the hook shape, tapering down to a narrower gap at the bottom. In this example, when the flange of the pump coupler 204 (e.g., 104) is slid down onto the cradle component 206 (e.g., 106), the tapered shape of the hook shape, of the cradle arms 404 may allow for the flange of the pump coupler 204 to be drawn into and against the flange 402 (e.g., 302) of the cradle component 206 (e.g., 106). In this way, in this example, a seal between the rear face of the flange of the pump coupler 204, and the front face of the flange 404 of the cradle component 206 may be improved. In this implementation, the front face of the flange 404 of the cradle component 206 may comprise sealing face of the cradle component, for example, which can form a seal with the rear face of the pump coupler 204 flange (e.g., with or without a gasket disposed between the rear face of the pump coupler 204 and the sealing face of the cradle component 206). In this implementation, a fluid opening 408 (e.g., 308) of the cradle component 206 (e.g., 106) can be disposed in substantially sealed, fluid coupling with the pump coupler 204 (e.g., 104).

Additionally, in one implementation, the cradle flange 404 of cradle component 206, comprising it's front face operably disposed in a substantially vertical plane, can comprise a cut out 414 (e.g., 314 of FIG. 3D) that is disposed at a top of the front face. In this implementation, the cut out 414 can be angled backward toward a rear face of the cradle flange 404 of the cradle component 206, from bottom to top. That is, for example, the front face can comprise the cut-out 414 at the top, angling backward, which may allow for improved installation of the pump coupler 204 into the cradle component 206. As an example, during installation, the pump coupler 204, due to a weight forward disposition, may tilt forward. In this example, this forward tilt may dispose the bottom rear corner of the pump coupler 204 in position to engage the top front portion of the cradle component 206. By creating the cut-out 414, for example, the bottom rear corner of the pump coupler 204 may slid over the cut-out 414 and into a desired engagement with the cradle arm component 252, instead of being hung up on the top front portion of the cradle component 206.

In one implementation, as illustrated in FIGS. 4A-4F, the rear coupler 226 of the cradle component 206 can comprise an extension 406 comprising a non-threaded surface, with internal threading 410. In this example implementation, the rear coupler 226 can be coupled with a pipe adapter, such as a street fitting, by threadedly engaging the extension 406 with the adapter using the internal threads 410. In this way, for example, the extension 406 may be allowed to have a shorter length than one having external threads, which may allow the example system 200 to be installed in a basin or pit having a smaller diameter.

In one aspect, the guide component can be formed from one or more separate components. In one implementation, as illustrated in FIGS. 1, 2A-2C, and 7, the guide component 102, 202, can comprise the respective guide rails 146a, 246a, 146b, 246b, and the guide wall 150, 250. In one implementation, the respective guide rails 146a, 246a, 146b, 246b, may be formed separately from their associated guide wall 150, 250, and secured together (e.g., fastened, welded, bonded, glued, soldered, etc.). In another implementation, the respective guide rails 146a, 246a, 146b, 246b, may be formed together with their associated guide wall 150, 250, as a single piece formed together (e.g., molded, extruded, layered, milled, etc.)

Figure 6:
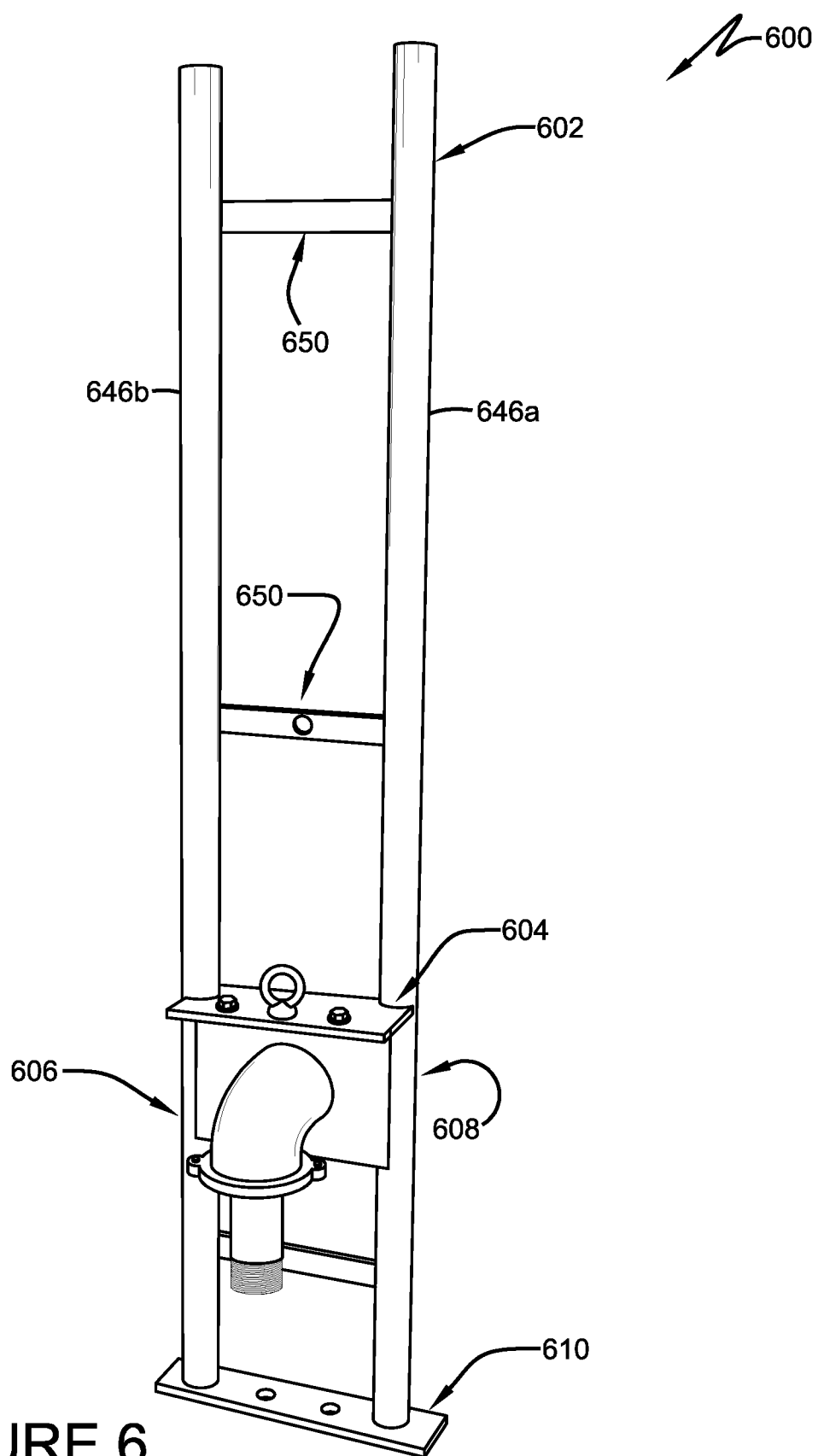
FIG. 6 is a component diagram illustrating an example implementation of one or more portions of one or more components described herein.
Figure 7:
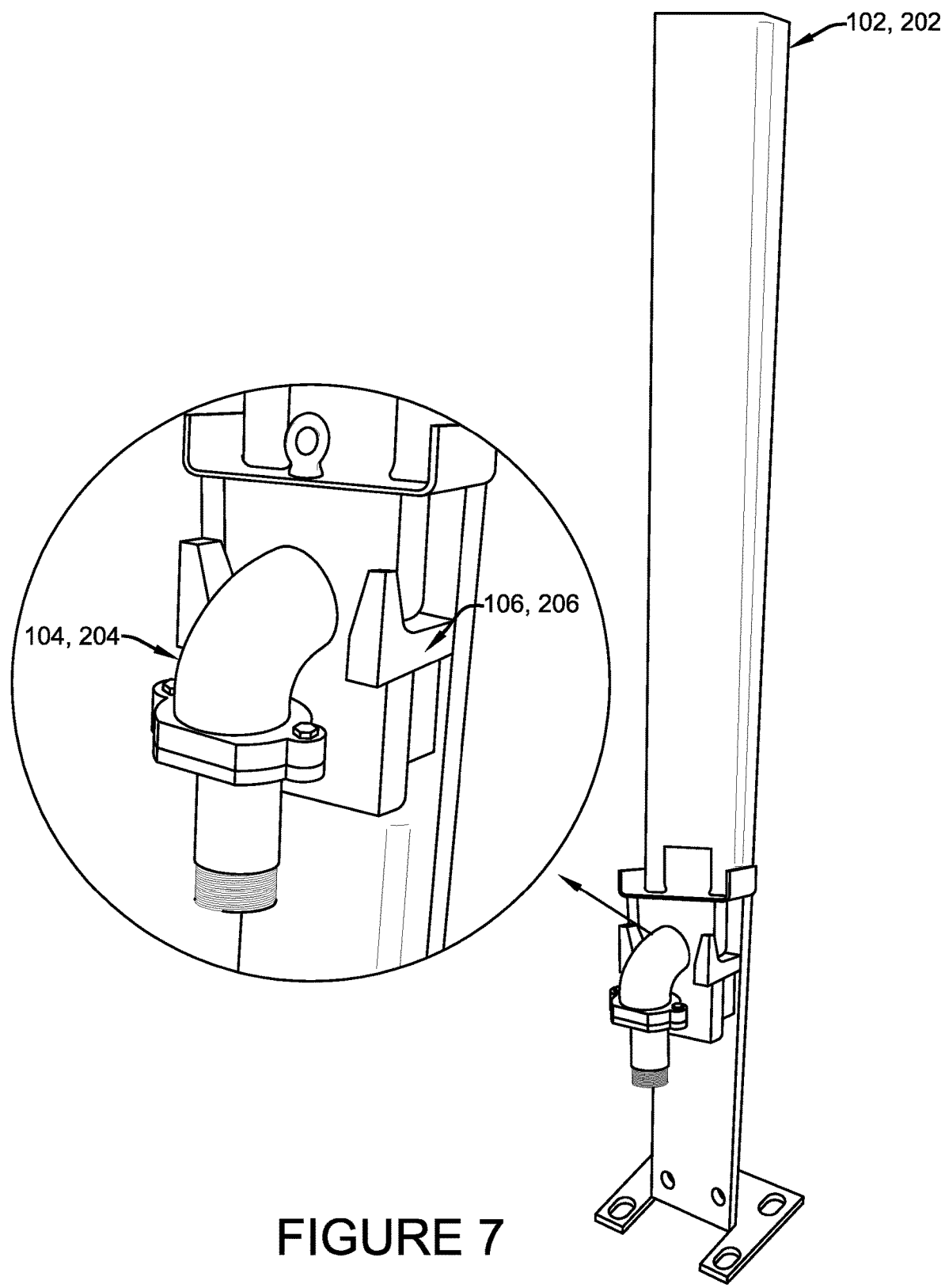
FIG. 7 is a component diagram illustrating an example implementation of one or more portions of one or more components described herein.

In another implementation in this aspect, as illustrated by the example system 600 in FIG. 6, the guide component 602 may be comprised of separate components fixed together in operable engagement. For example, in this implementation, 2 or more rails 646a, 646b, can be joined by one or more support brackets 650. Further, in this example, a guide wall 608 can be secured (e.g., welded, soldered, bonded, etc.) to the respective rails 646a, 646b. In this implementation, a cradle component 604 may be fastened to the guide wall 608, and a pump coupler 604 can be operably, slidably engaged with the cradle component 606. Additionally, a lower guide bracket 610 may be used to secure the guide component 602 to a lower portion of the target basin, and an upper bracket (not shown, or alternatively 650) can be used to secure the guide component 602 to an upper portion of the target basin.

Figure 8:
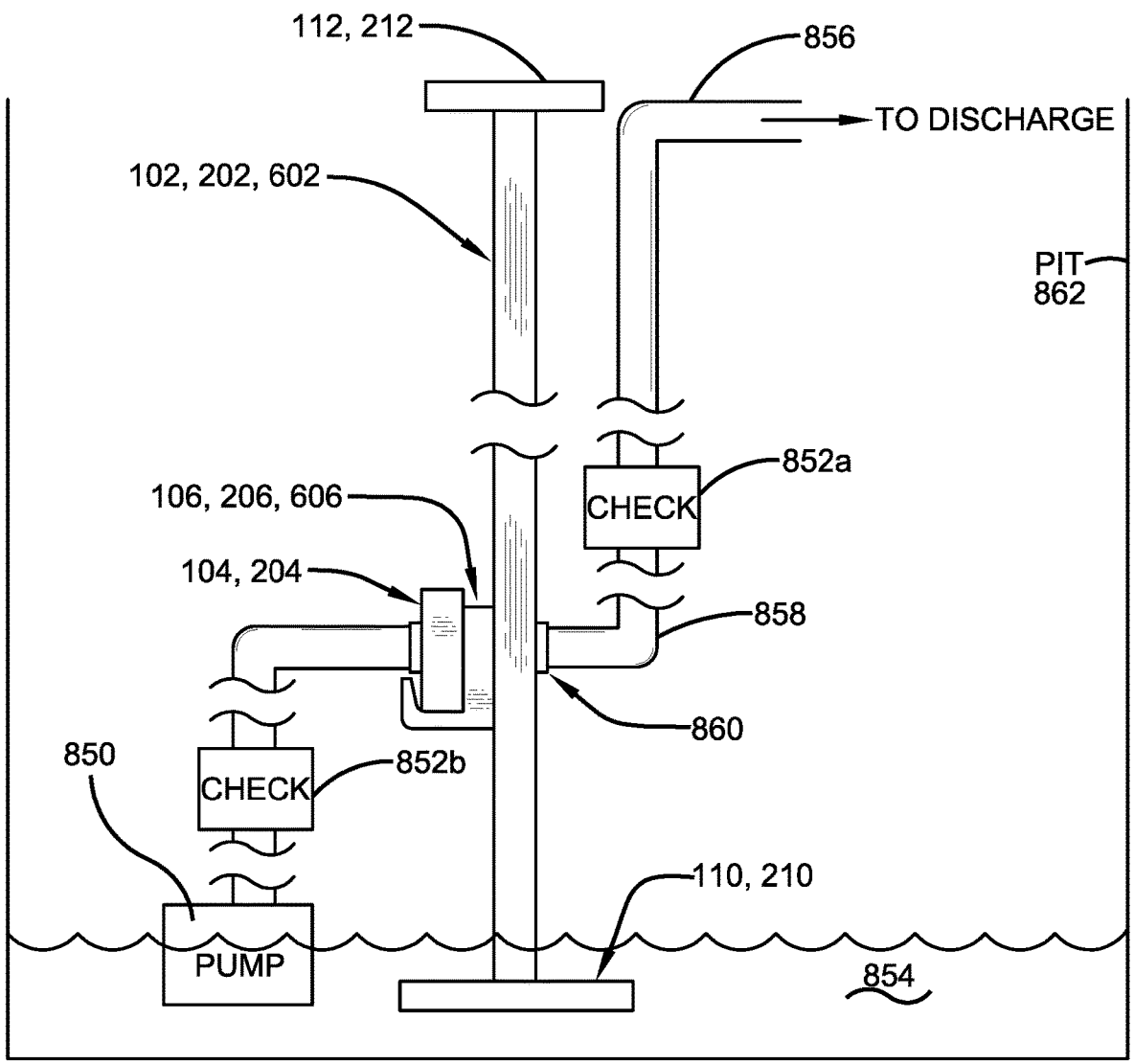
FIG. 8 is a schematic diagram illustrating an example implementation of an environment where one or more portions of one or more components described herein can be implemented.

FIG. 8 is schematic diagram showing an illustrative example of one or more portions of a system that can be used to remove fluids 854 from a basin or pit 862. In this example implementation, a fluid check valve 852b can be operably disposed between a pump coupler (e.g., 104, 204) and a pump 850 used to move fluid from the pit 862. Alternately (e.g., or at the same time) a fluid check valve 852a can be operably disposed between a rear coupler 860 and a portion of the fluid discharge pipe 856. As an example, the check valve 852b can be coupled with pump adapter 130, 230 or the removable coupling 124, 224 (e.g., respectively in FIGS. 1 and 2A). In this example, the check valve 852b may be able to be selectably removed from the pit 862 with the pump 850, by slidably disengaging the pump coupler 102, 104 from the cradle component 160, 206, 606. As another example, the check valve 852a may be coupled with a discharge adapter 858 coupled with the rear coupler 860, and coupled with the discharge line 856. In this example, the check valve 852a may be used to mitigate back flow of fluid through the cradle component 106, 206, 606 after removal of the pump coupler 104, 104 (e.g., with the pump 850.

In one aspect, a method of manufacturing a system for removing fluids from a basin may be devised. In one implementation, an example method of manufacturing can comprise selectively installing a cradle coupling port (e.g., 148, 248 of FIGS. 1 and 2A respectively) through a guide wall (e.g., 150, 250 of FIGS. 1 and 2A respectively) of a guide component (e.g., 102, 202 of FIGS. 1 and 2A respectively) at a location selected for appropriate operable installation of a fluid pump in a target basin. In this implementation, the guide component can comprise at least two railings (e.g., 146a, 146b, 246a, 246b of FIGS. 1 and 2A respectively) operably disposed on either side of the guide wall. Further, this example method can comprise operably, fixedly engaging a cradle component (e.g., 106, 206 of FIGS. 1 and 2A respectively) with the guide component. In this implementation, a rear discharge coupler (e.g., 126, 226 of FIGS. 1 and 2A respectively) can be installed through the cradle coupling port, and the cradle component can be fastened to the guide wall.

In this implementation, the example method can comprise fluidly coupling the rear discharge coupler with at least a portion of a fluid discharge pipe (e.g., 856 of FIG. 8) at a rear of the guide wall. Further, the example method can comprise operably, fixedly engaging the guide component with the target basin at a bottom portion using a bottom bracket (e.g., 110, 210 of FIGS. 1 and 2A respectively), and at a top portion using a top bracket (e.g., 112, 212 of FIGS. 1 and 2A respectively). Additionally, the example method can comprise fluidly coupling a fluid pump (e.g., 850 of FIG. 8) with a pump coupler (e.g., 104, 204 of FIGS. 1 and 2A respectively). In this implementation, the pump coupler can comprise a rail engagement component (e.g., 128, 228 of FIGS. 1 and 2A respectively) that is configured to selectably, slidably engage the at least two railings. In the example method, the pump coupler can be selectably slid onto the guide component using the rail engagement component at least until the pump coupler engages the cradle component. In this method, in this way, a fluid seal is created between the pump coupler and the cradle component to allow fluid to move from the pump to the discharge pipe.

The word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, at least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Reference throughout this specification to "one implementation" or "an implementation" means that a particular feature, structure, or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations. Of course, those skilled in the art will recognize many modifications may be made to this configuration without departing from the scope or spirit of the claimed subject matter.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure.

In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

What is claimed is:

1. A system for installation of a fluid pump into a basin or pit, comprising:
    a guide component to fixedly install in a target fluid collection basin, the guide component comprising:
        at least two railings operably disposed between a lower portion of the basin and an upper portion of the basin;
        a guide wall disposed between the at least two railings, the guide wall so dimensioned to receive a cradle coupling port disposed through the guide wall at a location selected for appropriate installation of a fluid pump in the target basin; and
    a cradle component to fixedly install on the guide component, the cradle component comprising:
        a rear coupler to operably, fixedly engage the guide component through the guide wall at the cradle coupling port to operably, fluidly couple with a fluid discharge pipe, and
        a cradle arm component to selectably, operably receive a pump coupler and hold the pump coupler in operable, fluid coupling with the rear coupler,
        wherein the pump coupler fluidly couples a discharge portion of a pump with the fluid discharge pipe, the pump coupler selectably, slidably coupled with the cradle component using the cradle arm component of the cradle component, and slidably coupled with the respective at least two railings.

2. The system of claim 1, the guide component comprising one or more of: an upper bracket to fixedly engage the basin at an upper portion; and
    a lower bracket to fixedly engage the basin at a lower portion.

3. The system of claim 1, the guide component comprising the cradle coupling port disposed through the guide wall at the location selected for appropriate installation of the fluid pump in the target basin.

4. The system of claim 3, the cradle coupling port formed by removing a portion of the guide wall selected for appropriate installation of the pump for the target basin.

5. The system of claim 1, the guide component comprising a guide wall bracket operably disposed in a fixed engagement with the cradle component at a rear face of the guide wall, the guide wall bracket comprising a bracket port to allow the rear coupler to pass therethrough.

6. The system of claim 1, comprising a fastener component to operably, fixedly engage the cradle component with the guide component.

7. The system of claim 1, the cradle arm component comprising one or more arms extending substantially perpendicular from a front face of a cradle flange of the cradle component, respective arms comprising a hook shape operably protruding toward a top portion of the cradle component.

8. The system of claim 7, the cradle component comprising a gap between a rear face of the hook shape and the front face of the cradle flange of the cradle component, the gap narrowing from the top to the bottom to facilitate creation of a fluid seal between the pump coupler and the cradle component.

9. The system of claim 1, the cradle component comprising a front face operably disposed in a substantially vertical plane, and comprising a cut out disposed at a top of the front face, the cut out angled backward toward a rear face of the cradle component from bottom to top.

10. The system of claim 1, comprising a rail engagement component operably, fixedly disposed on the pump coupler, the rail engagement component operably, slidably engagable with the at least two railings to operably, selectably slide the pump coupler into and out of engagement with the cradle component.

11. The system of claim 1, the at least two railings and the guide wall comprised in a single component formed together.

12. The system of claim 1, comprising a fluid check valve operably disposed at one or more of:
   between the pump coupler and the pump; and
   between the rear coupler and a portion of the fluid discharge pipe.

13. A system for removing fluids from a basin, comprising:
   a guide component fixedly installed in a target fluid collection basin at a top portion and a bottom portion, the guide component comprising:
      at least two railings operably disposed between the top portion and the bottom portion;
      a guide wall operably, fixedly engaged with the at least two railings; and
      a cradle coupling port operably disposed through the guide wall at a location selected for appropriate operable installation of a fluid pump in the target basin;
   a cradle component operably, fixedly engaged with the guide component, the cradle component comprising:
      a rear discharge coupler operably, fixedly disposed through the guide wall at the cradle coupling port, and operably, fluidly coupled with at least a portion of a fluid discharge pipe; and
      a cradle arm component extending from a front of the cradle component;
      a sealing face disposed at the front of the cradle component; and
   a pump coupler operably, fluidly coupled with the pump, and slidably engaged with the cradle component at the cradle arm component, and operably sealedly engaged with the sealing face of the cradle component, the pump coupler comprising a rail engagement component operably, slidably engaged with the at least two railings.

14. The system of claim 13, comprising a gasket operably disposed between a rear face of the pump coupler and the sealing face of the cradle component.

15. The system of claim 13, the guide wall formed with the two or more railings, and operably, fixedly engaged with a top bracket and a bottom bracket.

16. The system of claim 15, the top bracket operably, fixedly engaged with the top portion of the basin, and the bottom bracket operably, fixedly engaged with the bottom portion of the basin.

17. The system of claim 13, the rear discharge coupler comprising an internal thread to threadedly couple with at least a portion of the fluid discharge pipe.

18. The system of claim 13, the cradle component selectably, removably fastened to the guide wall.

19. A method of manufacturing a system for removing fluids from a basin, comprising: selectively installing a cradle coupling port through a guide wall of a guide component at
   a location selected for appropriate operable installation of a fluid pump in a target basin, the guide component comprising at least two railings operably disposed on either side of the guide wall;
   operably, fixedly engaging a cradle component with the guide component, comprising installing a rear discharge coupler through the cradle coupling port, and fastening the cradle component to the guide wall;
   fluidly coupling the rear discharge coupler with at least a portion of a fluid discharge pipe at a rear of the guide wall;
   operably, fixedly engaging the guide component with the target basin at a bottom portion using a bottom bracket, and at a top portion using a top bracket;
   fluidly coupling a fluid pump with a pump coupler, the pump coupler comprising a rail engagement component configured to selectably, slidably engage the at least two railings; and
   selectably sliding the pump coupler onto the guide component using the rail engagement component at least until the pump coupler engages the cradle component to create a fluid seal between the pump coupler and the cradle component to allow fluid to move from the pump to the discharge pipe.

* * * * *